United States Patent [19]

Menigat et al.

[11] Patent Number: 4,637,171
[45] Date of Patent: Jan. 20, 1987

[54] METHOD OF CONTINUOUS COMPENSATION OF UNBALANCE PRESENT IN A ROTOR AND IN PARTICULAR IN A GRINDING WHEEL

[75] Inventors: Roland Menigat, Liederbach; Klaus Gruppenbacher, Dieburg, both of Fed. Rep. of Germany

[73] Assignee: Hofmann Werkstatt-Technik GmbH, Pfungstadt, Fed. Rep. of Germany

[21] Appl. No.: 825,146

[22] Filed: Feb. 3, 1986

[30] Foreign Application Priority Data

Feb. 4, 1985 [DE] Fed. Rep. of Germany ....... 3503724

[51] Int. Cl.$^4$ ............................................. B24B 41/04
[52] U.S. Cl. ................................... 51/281 R; 51/169; 51/165.87
[58] Field of Search .......................... 74/573; 210/363; 51/281 R, 165.71, 165.87, 168, 169

[56] References Cited

U.S. PATENT DOCUMENTS 3,950,897  4/1976  Birkenstack et al. ............. 51/169 X

FOREIGN PATENT DOCUMENTS 2357629  5/1975  Fed. Rep. of Germany .

OTHER PUBLICATIONS

"Measuring Methods and Instruments of Hofmann Balancing Machines", by Gunter Junck, Hofmann News No. 5.
"Principles of Balancing and Balancing Machines", by Gunther Himmler, Hofmann Info. No. 1.

*Primary Examiner*—Robert P. Olszewski
*Assistant Examiner*—Maurina Rachuba
*Attorney, Agent, or Firm*—Fleit, Jacobson, Cohn & Price

[57] ABSTRACT

A method of continuous compensation of unbalance present in a rotor, in particular, a grinding wheel, where a compensation fluid is fed into correction chambers rotating with and arranged on the rotor at various angular locations. This supply of fluid is effected in successive balancing processes during rotation of the rotor and as a function of the initial unbalance of the rotor as determined by a transducer, whereby the phase shift between actual angular location of unbalance, the respective transducer output and the amplitude transmission error is taken into account.

6 Claims, 4 Drawing Figures

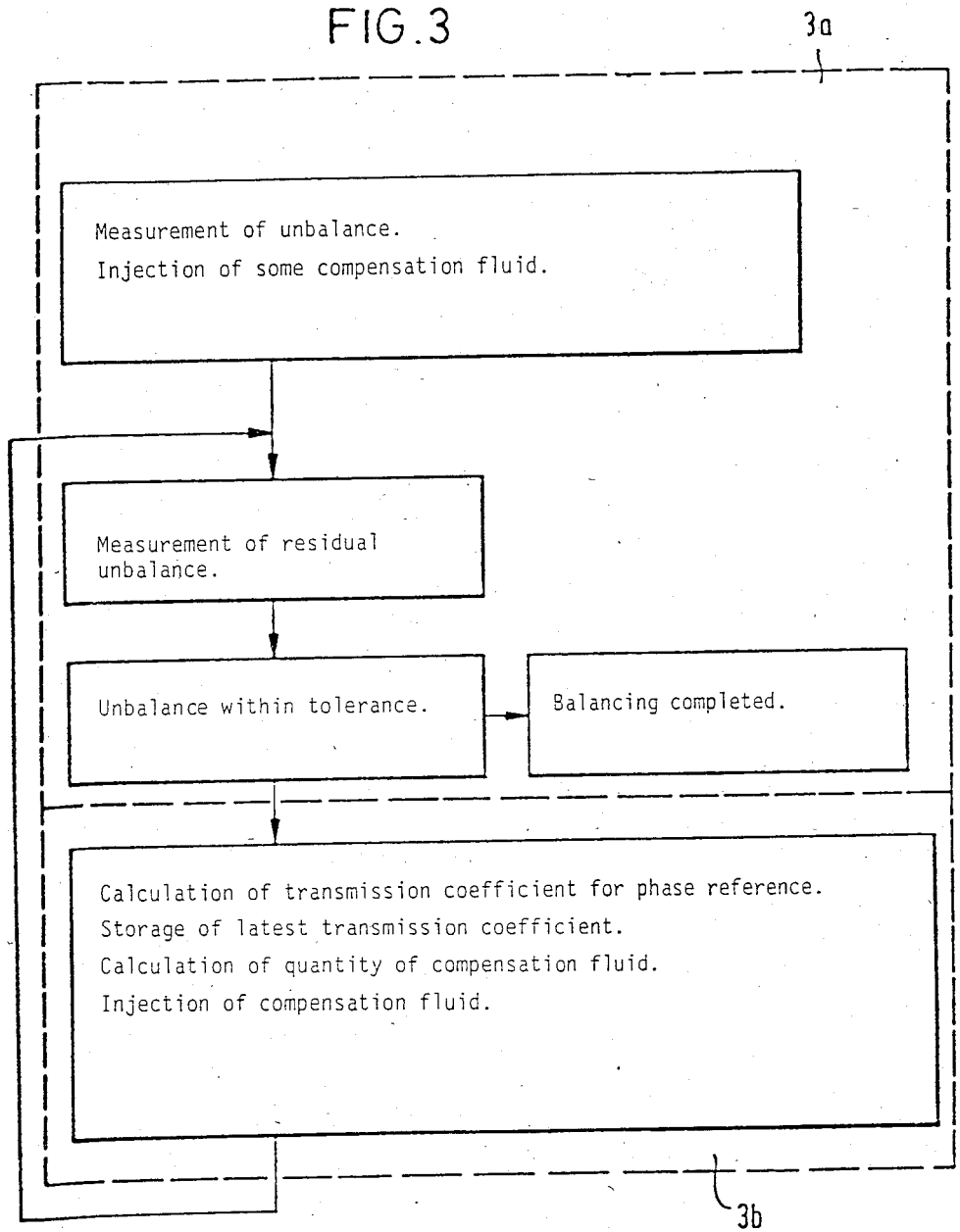

“METHOD OF CONTINUOUS COMPENSATION OF UNBALANCE PRESENT IN A ROTOR AND IN PARTICULAR IN A GRINDING WHEEL

BACKGROUND OF THE INVENTION

A balancing apparatus for compensation of unbalance is shown in German Application No. DE-OS 23 57 629 which corresponds to U.S. Pat. No. 3,950,897 (incorporated by reference herein). The present inventive method is used to control this device. With this method, a grinding wheel is rotated at a constant number of revolutions per minute. However, in present applications, constant cutting speed and consequently constant surface speed of the machining rotor are required for grinding wheels and similar rotors used to machine a workpiece. As the workpiece is being machined, there is obviously wear on the peripheral surface of the rotor, in particular, the grinding wheel, so that the number of revolutions per minute of the rotor has to be increased. In general, the speed range is in excess of 750 to 2000 revs per minute. Hence, unavoidably, the rotor operates above and below a resonance frequency, i.e., passes through a critical speed range as it goes from subcritical to overcritical due to the given mass of bearings, spindle and rotor, e.g., headstock and grinding wheel. As the critical speed range is passed through, there is a phase shift from 0 to 180 degrees between the angular location of unbalance and the respective vibratory motion. Consequently, the vibration signal supplied by the transducer can no longer be used for accurate control of mass corrections as the phase shift will always occur when the critical speed range is exceeded.

Furthermore, the unbalance signal supplied by the transducer depends on the unknown machine behavior, which varies constantly because, in machining operations involving rotors, such as grinding wheels, the rotor mass is constantly changing. On the other hand, continuous balancing of the rotor is needed during the machining operation in order to obtain good results and avoid poor quality, chatter, waviness and unwanted relative motion between the workpiece and the tool. The present invention is directed toward filling that need.

SUMMARY OF THE INVENTION

It is the object of the present invention to provide a method where the rotor is exactly balanced during operation even when passing through the critical speed range.

The method of the present invention ensures that a workpiece can be machined by a rotor, such as a grinding wheel, which is maintained at a constant cutting speed. Since the grinding wheel is always evenly balanced, the quality of the finished surface will not be adversely affected while the rotor is in the critical speed range.

Compensation fluid is initially fed into correction chambers as a test during the balancing process. The amount of fluid used is preferably the least amount that produces the most accurate compensation. The minimum amount of fluid (i.e, measurable mass) is selected for a test quantity because the actual location of unbalance is not known when balancing operation begins. Therefore, there is a risk that the test quantity added at the location of unbalance will initially increase unbalance. In order to minimize this risk, the minimum amount of fluid is selected and depends on the vibration-mass system to be balanced. The amount of fluid thus used depends on the switching rates of the proportioning valves through which the compensation fluid is fed in, the operating speed of the electronic analyzer or computer system used for analyses, and the pressure in the supply line of the compensation fluid.

The test quantity is preferably fed into a chamber opposite the determined unbalance location because this will ensure optimum accuracy in the determination of the transmission coefficient between the rotor and the transducer. The primary effect is to determine the phase shift and amplitude transmission error of actual rotor unbalance relative to the transducer output signal.

The phase shift determined during a balancing process is preferably stored to serve as the basis for the following balancing process. This results in a sensitive phase adjustment for successive balancing operations, especially over the critical speed range. The phase shift can also be accomplished by a feedback process when the phase shift or transmission coefficient is stored for the next determination of the transmission behavior (phase shift and amplitude transmission error) of the transmission path between the rotor and the transducer.

In order to minimize the effects of non-linearities in transmission of unbalance signals, the preferred method is to evenly distribute the quantity of fluid determined necessary to compensate for the residual unbalance into two adjacent correction chambers.

Continuous unbalance measurement is preferably carried out using the known auto-tracking measurement technique, which is explained in the publication by Gunter Junck, entitled "Hofmann News No. 5, Measuring Methods and Instruments of Hofmann Balancing Machines" (incorporated by reference herein), printed in the Federal Republic of Germany by Gebr. Hofmann GmgH & Co. HG, 6102 Pfungstadt/West Germany. This technique combines a tracking filter which is operative over the whole speed range of the rotor to be balanced with phase-controlled rectification and automatic selectivity adjustment during measurement.

BRIEF DESCRIPTION OF THE DRAWINGS

Details of the inventive method can be learned from the accompanying drawings, in which:

FIG. 3 is a flowchart used to explain the inventive method as applied to a balancing operation.

DESCRIPTION OF THE PREFERRED EMBODIMENT

Figure 1A:
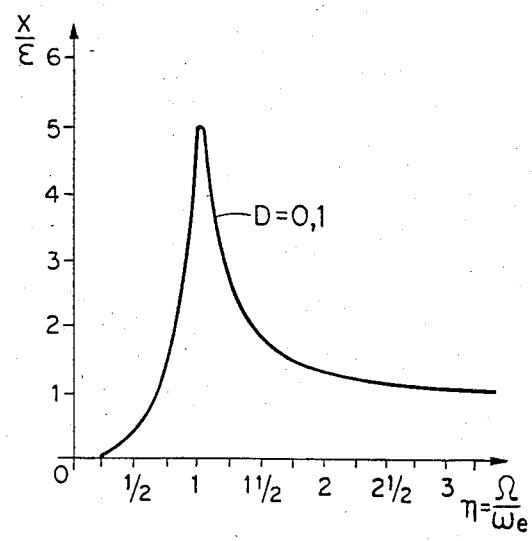
FIGS. 1(a) and (b) illustrate two graphs showing the vibratory behavior of an unbalanced rotor when passing from the subcritical speed range to the overcritical one.
Figure 1B:
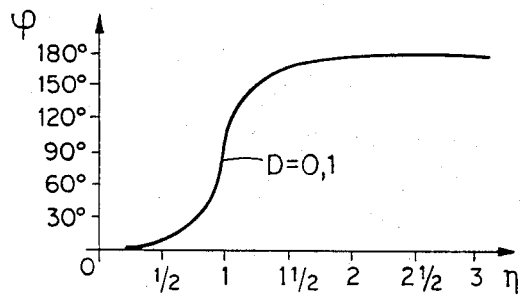

The diagram as per FIG. 1a shows a graph of the amplitude of an unbalanced damped rotor. The frequency ratio $\eta = (\Omega/\omega e)$ is plotted on the abscissa, where $\Omega$ is the exciting frequency of the unbalanced rotor and $\omega e$ is the natural frequency of the rotor. The ratio of vibration displacement vector X relative to mass eccentricity $\epsilon$ is plotted on the ordinate. Damping D is 0.1. A phase shift of measured unbalance relative to actual unbalance results from the dynamic behavior of the vibrating system as a function of the ratio of its exciting frequency relative to its natural frequency. In the diagram as per FIG. 1b, the phase shift $\phi$ is plotted against the frequency ratio η, beginning in the subcritical speed range (phase shift φ=0) and advancing into the overcritical speed range (phase shift φ=180 deg.). As can be seen from diagram 1b, the phase shift between the actual location of unbalance on the rotor (angular location of unbalance) and the resulting vibratory motion varies considerably at increasing speeds so that unbalanced rotors operating or rotating in this speed range cannot be accurately balanced. A detailed treatment of the principles of balancing is presented in the publication by Gunther Himmler, entitled "Hofmann Info. No. 1, Principles of Balancing and Balancing Machines" (incorporated by reference herein), printed in the Federal Republic of Germany by Gebr. Hofmann GmbH & Co. KG, 6102 Pfungstadt/West Germany.

Figure 2:
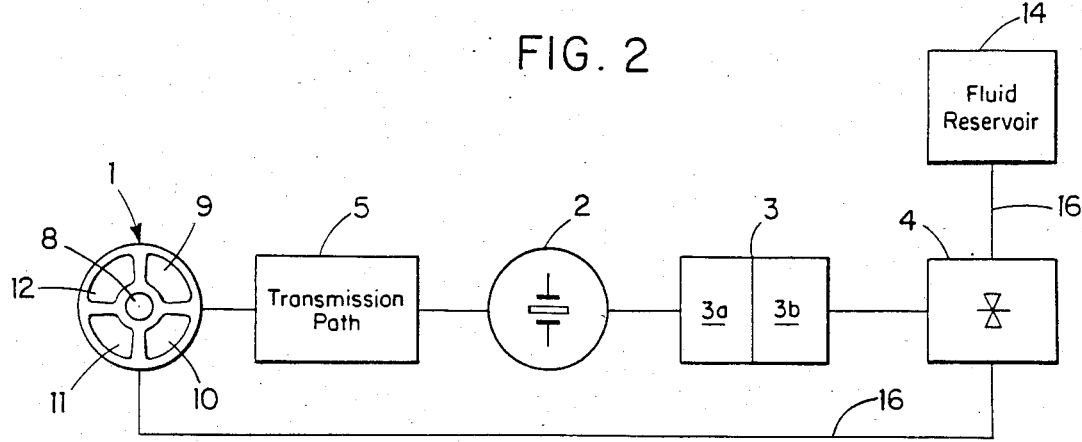
FIG. 2 is a block diagram showing the arrangement of the individual function groups applicable for putting the inventive method into practice.

FIG. 2 schematically shows the grinding wheel 1 of a grinding machine (not represented) of a device for practicing a preferred embodiment of the inventive method. The grinding wheel 1 may designed similar to the one in the previously mentioned U.S. Pat. No. 3,950,897 which discloses a balancing apparatus, particularly for a grinding wheel 1, whereby the wheel has four chambers 9–12 disposed around its axis of rotation by spindle 8 with each chamber connected to one face of a ring shaped container by a slot formed in a circular recess at a different radius so that the wheel can be balanced by injecting cooling fluid or the like from a fluid reservoir 14 into the slots by valve 4 to temporarily add fluid to selected chambers.

The unbalance of the grinding wheel 1 is continuously compensated for in successive balancing operations during the grinding process. The vibrations produced by the unbalance of the grinding wheel 1 are detected as respective measured signals. The signals are detected through a transmission path 5 by a transducer 2 (in particular an acceleration transducer) and are forwarded to an electronic measuring and closed-loop control system 3. Transmission path 5 as per FIG. 2 is illustrated schematically only, e.g., for the whole grinding machine. The transmission path between rotor 1 and transducer 2 includes the amplification factor inherent in the machine as well as phase angle and phase error of the vibrations caused by unbalance. As such data is not known, precise balancing is not possible. Therefore, it is the object of the present invention to ensure precise and correct balancing although such data of the transmission path 5 is not known.

The transducer 2 is of a known type and can be purchased from any manufacturer. It may be of force-measuring, displacement-measuring or acceleration-measuring type. The transducer may be installed in any position on the grinding machine. In order to obtain good results, it should be installed near the grinding wheel's bearings on the machine, though.

The electronic system is made up of two parts. The first part is an electronic measuring unit 3a where the amount and location of unbalance of the grinding wheel 1 are continuously determined over the whole speed range of the grinding wheel. The second part is an analyzing and closed-loop control unit 3b which drives and controls the valve device 4 of a balancing system.

Valve device 4 is a common valve which is preferably driven by an electrical means as shown and described in German Application No. DE-OS 23 57 629 corresponding to U.S. Pat. No. 3,950,897 (incorporated by reference herein).

Open and closed loop controller 3 of FIG. 2 may perform as in the auto-tracking method as described in Hofmann News No. 5 (described above). The control is through software and is a function of the determined unbalanced data in accordance with the steps shown in the flowchart illustrated in FIG. 3.

THe phase difference (phase shift φ) is calculated as the difference between the angular location of unbalance and the resulting vibratory motion that is built up in the transmission path 5 during the determinations of vibrations produced by rotor unbalance. The machine-specific amplitude transmission error in the transmission path results from the changing vibratory behavior, e.g., of the grinding machine. This vibratory behavior changes in particular as a result of change of mass, such as injection of correction medium into the annular container. This change of mass will necessarily influence the vibration-mass system and consequently the reading of measured amplitude. The phase difference and the amplitude transmission error are determined once the measured signals supplied by transducer 2 are detected by the electronic measuring unit 3a in the electronic analyzer 3b which may be a computer. The phase shift and amplitude transmission error are then used for relative control of the valves of the valve device 4 for selectively passing fluid from the fluid reservoir 14, through four lines 16 and into the chambers 9–12 in the grinding wheel 1. Each of the fluid lines is associated with a particular one of the chambers 9–12 as well as a particular one of the four valves constituting valve 4.

The unbalance initially measured is called initial unbalance. It includes the actual unbalance of a rotor and noise contribution. Actual unbalance is hence the true unbalance inherent in the rotor and unaffected by noise contribution. After correction fluid has been injected into the annular container, another measurement is taken and the unbalance then measured is called residual unbalance. Residual unbalance should be balanced as well in order to achieve optimum, that is, zero balance of the whole system.

After detection of the unbalance signals, which are measured and forwarded by transducer 2 and still include the machine-specific phase shift and the amplitude transmission error of the transmission path 5, a minor quantity of compensation fluid is injected into one of the four correction chambers, which is opposite the angular location of unbalance on the rotor. The resulting residual unbalance is measured again and, if within a predetermined tolerance, the balancing operation is aborted. If the residual unbalance is still out of the predetermined tolerance, the phase shift and amplitude transmission error of the transmission path 5 are determined on the basis of the initial unbalance (which included phase shift and amplitude transmission error), the quantity of compensation fluid and the angular location of the chamber where it was injected. The residual unbalance measured after injection of the quantity of compensation fluid is taken into account for proportioning of the quantity of compensation fluid used to compensate for the residual unbalance. The transmission factor of the phase shift is stored and can be taken into account again for determination of the phase shift of subsequent balancing operations. The relative valve or valves of the valve device 4 are then opened for a certain time as a function of the quantity of compensation fluid determined so that the quantity of fluid will be fed into the relative correction chamber or chambers.

From the foregoing description of the preferred embodiment of the invention, it will be apparent that many modifications may be made therein. It should be understood that this embodiment is intended as one example of the invention only and that the invention is not limited thereto. Therefore, it should be understood that the appended claims are intended to cover all modifications that fall within the true spirit and scope of the invention.

What is claimed is:

1. A method of continuous compensation of unbalance present in a rotor, wherein a compensation fluid is fed into correction chambers rotating with and arranged on said rotor at various angular locations, said supply of fluid being effected in successive balancing operations during rotation of said rotor as a function of the initial unbalance of said rotor as determined by a transducer, the method comprises:

performing a balancing operation with a lesser quantity of said compensation fluid than determined for balancing as a function of said initial unbalance by initially feeding said lesser quantity of said compensation fluid into a certain correction chamber;

determining the phase shift between the actual angular location of said initial unbalance and respective location of vibratory motion represented by transducer outputs;

determining the amplitude transmission error indicating the difference between said actual amount of unbalance and respective transducer output, said amplitude transmission error being based upon a measurement of residual unbalance, said initial unbalance, said lesser quantity of said compensation fluid first fed into said certain correction chamber and said angular location of said chamber; and feeding a quantity of compensation fluid determined for the compensation of said residual unbalance into said correction chambers based upon said phase shift.

2. A method as set forth in claim 1, including feeding said lesser quantity of compensation fluid as a reproducible test into relative correction chambers.

3. A method as set forth in claim 1. including feeding said quantity of compensation fluid into said chamber opposite said angular location of unbalance measured.

4. A method as set forth in claim 1, including storing said phase shift, determined between said actual angular location of initial unbalance and said respective location of vibratory motion as a basis for the successive balancing operation or for determining the transmission behavior of said transmission path between said rotor and said transducer.

5. A method as set forth in claim 1, including using half of said quantity determined for compensation of said residual unbalance.

6. A method as set forth in claim 1, including distributing said quantity of compensation fluid to two correction chambers.

* * * * *